G. DUNCAN.
COMBINED PIPE COOLING AND TRIMMING APPARATUS.
APPLICATION FILED JAN. 29, 1904.
908,761.
Patented Jan. 5, 1909.
2 SHEETS—SHEET 1.
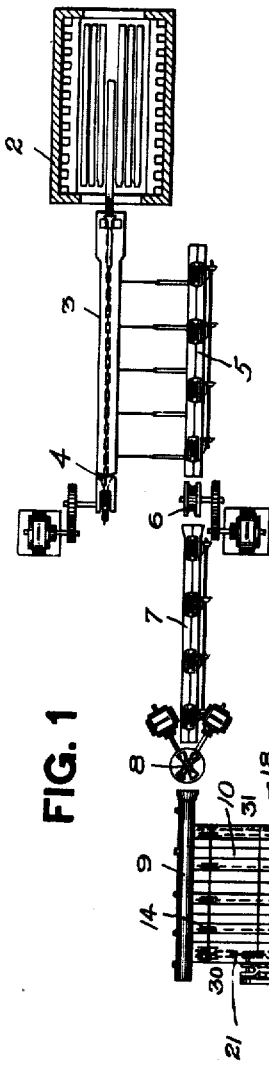
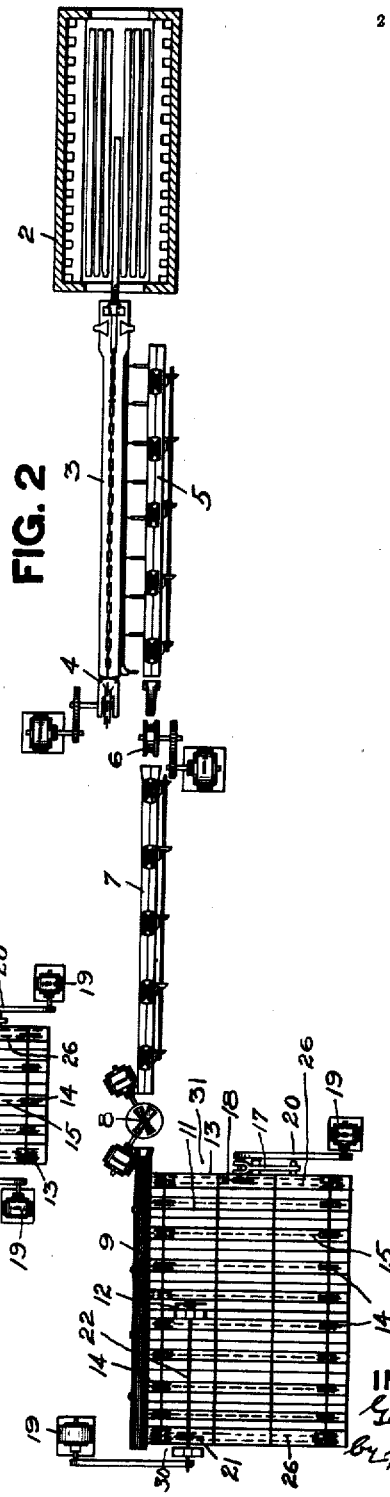
WITNESSES.
INVENTOR.
George Duncan

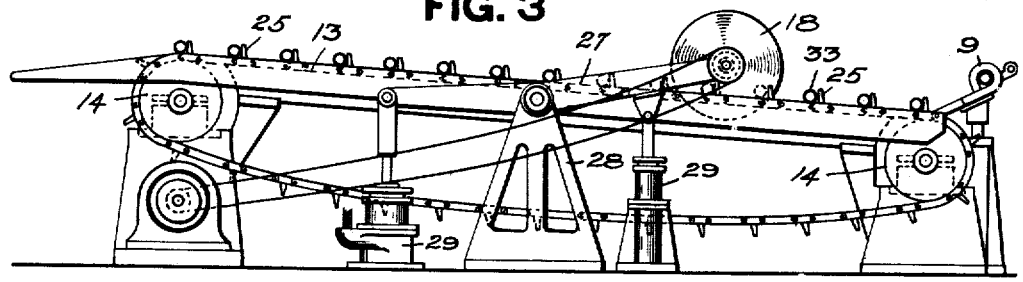
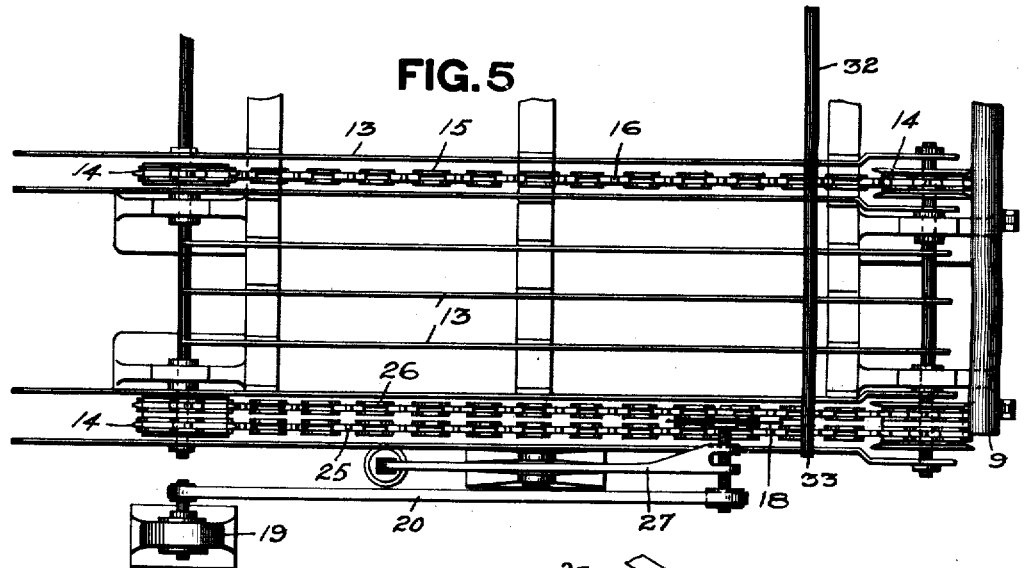
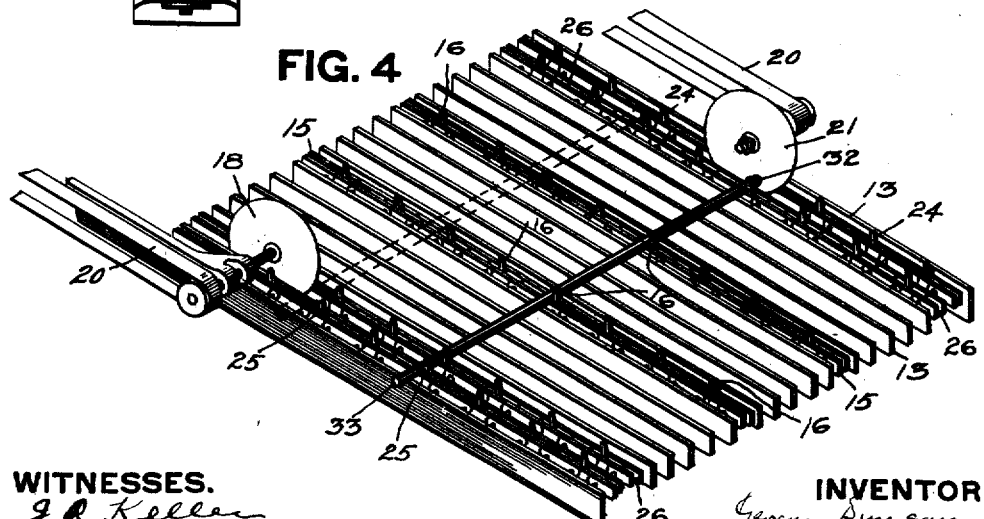

UNITED STATES PATENT OFFICE.

GEORGE DUNCAN, OF McKEESPORT, PENNSYLVANIA, ASSIGNOR TO NATIONAL TUBE CO., OF PITTSBURG, PENNSYLVANIA, A CORPORATION OF NEW JERSEY.

COMBINED PIPE COOLING AND TRIMMING APPARATUS.

No. 908,761.  Specification of Letters Patent.  Patented Jan. 5, 1909.

Application filed January 29, 1904. Serial No. 191,167.

*To all whom it may concern.*

Be it known that I, GEORGE DUNCAN, a resident of McKeesport, in the county of Allegheny and State of Pennsylvania, have invented a new and useful Improvement in Combined Pipe Cooling and Trimming Apparatus; and I do hereby declare the following to be a full, clear, and exact description thereof.

My invention relates to apparatus for cooling and trimming pipe, either lap weld or butt weld, being applicable to the trimming either of single length or double length pipe.

In the manufacture of welded pipe in the making of the weld there is always a slight portion at each end of the welded pipe which is imperfect and requires to be removed as scrap, first to form a true square end on the pipe, and second, to remove either unwelded or otherwise imperfect portions liable to be found at the ends. For instance, in the manufacture of butt weld pipe, where the plates or strips have the forward end trimmed and bent so as to cause the plate to form up properly in the welding bell there are a few inches at that end which must be removed, while at the other end of the pipe the edges do not abut exactly and it is usual to cut off at least a half inch at this end. It also occurs at times that the ends of the pipe are not sufficiently welded, because drawn from the furnace before they reach a welding heat or because the metal has been permitted to waste on the edges by over-exposure, so that the edges are not forced together with sufficient pressure to make a good weld; and further, the ends are sometimes imperfect on account of over-heating, forming burned or caved ends. The mass of such defects are apparent to the eye of the skilled workman, and the custom has been to permit the cooling of the pipe and then to pass the pipe to the cutting and threading tables where the workmen examine the same, first cutting off the necessary scrap and then threading the pipe. Imperfections are thus removed except such as are developed under pressure of testing.

The labor of trimming the ends of the pipe greatly increases the cost of finishing, and the object of the present invention is to overcome such relative cost by providing for the trimming of the ends of the pipe during the cooling operation.

To these ends my invention consists, generally stated, in the combination with the pipe welding apparatus and pipe finishing rolls, of a receiving trough back of and in line with the finishing rolls, and a cooling rack or table at the side of the receiving trough, this rack having a series of continuously moving fingers in line with each other, adapted to engage the pipe body at different points in its length, and a saw located in and cutting across the course of the pipe when moved by the fingers on the rack, thereby cutting or trimming the pipe during cooling.

It also consists in certain other improvements which will be hereinafter more particularly set forth and claimed.

To enable others skilled in the art to make and use my invention I will describe the same more fully, referring to the accompanying drawing, in which—

Figure 1 is a plan view of a plant for the manufacture of single length butt weld pipe to which the the invention is applied; Fig. 2 is a like view of a plant for the manufacture of double length butt weld pipe; Fig. 3 is a side view of the cooling rack or table illustrating the invention; Fig. 4 is a detail perspective view; and Fig. 5 is an enlarged detail plan.

In the accompanying drawing, Figure 1, the furnace 2 is illustrated as a regenerative furnace, being provided with suitable pipe welding apparatus such as a swinging draw bench 3 pivoted at 4 and having beside the same the sizing roll trough 5, which receives the tube from the welding apparatus, and feeds the same to the rolls 6 which in turn deliver the tube into the cross roll trough 7, the tube then passing through the cross rolls 8 into the final receiving trough 9 from which the tube passes on to the cooling rack or table 10. In Fig. 2 the same figures indicate the same parts which are made longer to provide for the manufacture of the double length tubing. The cooling rack 11 shown in Fig. 2, however, is made of double the length of the rack in Fig. 1, and a saw 12 is located about mid-way at the forward end of the same for cutting the tube into two sections.

Any suitable form of cooling racks, adapted to receive and carry the pipe in slow course and expose the entire body thereof to the atmosphere for cooling, may be employed. The racks shown in the drawing are composed of suitable frames having inclined supporting bars 13 and carrying at each end the sprocket wheels 14 mounted in said frames, which wheels carry the sprocket chains 15 provided at intervals with the carrying fingers or lugs 16, the custom being to locate such fingers on every alternate link of the chain, or otherwise as desired and the chains being so mounted on the several sprockets that a series of such lugs extend across the table in line with each other in position to receive the pipe dropped from the final receiving trough 9, engage with the body thereof at different points, and carry the pipe in lateral course by a slow steady movement from the lower to the upper end of the cooling table, the pipe being thus exposed to the atmosphere for a sufficient period to permit it to cool from the high heat required for welding and finishing until brought approximately to proper temperature for final threading. The traveling chains are preferably employed in connection with the inclined supporting bars 13 of the table or frame in order to rotate the pipe during cooling, the friction of the bars on the lower surface of the pipe acting to turn the pipe as it is pushed along the same by the carrying fingers, and this gives further advantage in connection with the sawing of the pipe, as the pipe will have a tendency to turn during sawing, and there is not as much liability of forming fins. The traveling chains of the cooling table are driven by any suitable means.

Mounted at one side of the cooling table is the saw frame 17 carrying the saw 18, such saw being shown as driven from a motor 19 by suitable belt 20. A like saw 21 driven by like connections is located on the other side of the cooling table. As shown in the drawing, one saw is mounted in advance of the other saw, so that during the cooling of the pipe one end of the pipe will come into contact with the one saw before the other end is brought into contact with the other saw. This is important in the matter of trimming pipe, because every inch or half inch of pipe saved is of value and it enables the operator or operators to so locate one end of the pipe as to properly trim that end, and after such trimming to locate the other end of the pipe so as to properly trim that end, as above described. If desired the saw 12 midway of the table for cutting the pipe into sections and the forward saw 21 may be supported on the same shaft 22, or the mid-saw 12 may be located forward of the rear saw 18, this being of advantage if it is desired to form pipe of fixed length such as eighteen feet, one length being thus cut to the standard length while the other length can be subsequently trimmed. It will be noticed that the outer chains on each rack are located outside of but close to the course of the saw. They are thus located in order to sustain the scrap end of the pipe during the cutting operation. The body of the pipe rests upon the racks and is supported by the numerous traveling fingers thereof, but during the cutting operation it is important that the portion cut from the end of the pipe shall be properly supported, and by so locating the outer supporting chain and the finger 24 or 25 thereof in line with the other fingers of the rack or carrier such outer fingers give this necessary support and provide for the cutting even of small scrap ends, which in some cases are not more than half an inch, and thereby provides for the saving of all the pipe possible. For some smaller sizes of pipe it is also desirable to support the pipe body on each side of and close to the saw to prevent bending of the pipe during sawing. To this end I may also employ carrying fingers close to the inner face of the saw, such as by the use of an additional chain 30 provided with such fingers.

In the preferred construction the bearings of the saw remain stationary during the trimming operation, the saw passing in its course slightly below the inclined bars of the table. For some purposes, however, and for the trimming of some pipe, the saw may be made to reciprocate, and for that purpose its supporting arm 27 is illustrated as mounted in suitable bearings 28 and its movement is controlled by one or more hydraulic cylinders 29.

The invention will be described in connection with the manufacture of butt weld tubing, though of course known to be applicable to all kinds of tubing which after manufacture require to be cooled and trimmed. The blanks being charged into the welding furnace are fed when at the proper heat to the welding apparatus in the proper way, and the welded tube then passes from the welding apparatus to the finishing rolls, such as by passing into the sizing roll trough 5 and then through the sizing rolls themselves and into the cross roll trough 8 and through the cross roll to the final receiving trough 9, from which the pipe is fed onto the cooling rack, as in Fig. 1. When received upon the cooling rack or table the series of endless traveling fingers thereof engage the body of the pipe throughout its length and carry it laterally along at slow speed.

For the operation of trimming the ends of the pipe boys or other suitable workmen are located one on each side of the cooling table and these workmen by inspection of the pipe can tell about how much is required to be trimmed from one or the other end of the same. For example, the workman standing on the rear side of the cooling rack and inspecting the pipe such as in the position 30, can by means of his tongs grasp the rear end of the pipe and slide it along the cooling rack so as to properly locate the rear end of the same for trimming by saw 21, and as the pipe is advanced on the cooling table this end of the pipe will be gradually fed to the saw, and that scrap end will be cut from the pipe. As soon as that end of the pipe is trimmed the workman at the point 31 inspecting the other end of the pipe, can draw it along on the cooling table and so locate it as to provide for the cutting of the scrap from that end of the pipe and as the pipe is gradually fed forward that scrap end is cut therefrom by means of the saw 18. When the mid-saw 12 is located forward of the rear saw the first sections will be cut to standard length, while the pipe may be so positioned by the second workman standing at 31 for cutting by the rear saw to make as little scrap as practicable. In both such cutting operations, as the outer finger 24 or 25 of the series of fingers carrying the pipe engages with the scrap end to be cut off, it supports the same until it is finally sawed from the tubing and drops below the rack. In Fig. 4 this operation is illustrated, the pipe body being shown at 32, while the scrap to be cut therefrom is shown at 33. When a cooling rack of the form illustrated having the inclined bars with the traveling chain carriers is employed, as the pipe has a tendency to rotate as it is fed over the bars, as above stated, there will also be the tendency for the pipe to turn as it is being cut by the saws and this will reduce the tendency toward finning.

For the purpose of cutting the pipe I may either employ a hot saw or a cold saw according to the condition of the pipe, the pipe close to the entrance end of the cooling table being generally hot enough to be easily cut by means of the ordinary hot saw which requires less power to drive.

By the above operation the cost of trimming the pipe is materially reduced and the trimming becomes practically automatic, though at the same time the pipe can be so located for trimming that all the good pipe can be saved and scrap wastage be reduced to a minimum. The pipes as thus cooled and trimmed then simply require to be taken to the threading machines and properly threaded, the labor of cutting the pipe when cool by suitable dies being avoided.

What I claim is:—

1. The combination of pipe welding apparatus, pipe finishing rolls and a receiving trough back of and in line therewith, and a cooling rack at the side of the receiving trough having a series of continuously moving fingers in line with each other adapted to engage the pipe body at different points in its length, and a saw located in and cutting across the course of the pipe when moved by the fingers on the rack and thereby acting to cut or trim the pipe during cooling.

2. The combination of pipe welding apparatus, pipe finishing rolls and a receiving trough back of and in line therewith, and a cooling rack at the side of the trough having a series of continuously moving fingers in line with each other adapted to engage with the pipe body at different points in its length and carry the pipe in lateral course on said rack, a saw located on each side of the rack in the course of the pipe when carried thereby, one saw being set in advance of the other, and a saw being located about mid-way of the rack.

3. The combination with pipe welding apparatus, pipe finishing rolls and a receiving trough back of and in line therewith, of a pipe cooling rack at the side of the trough having a series of continuously moving fingers in line with each other adapted to engage the pipe body at different points in its length, and a saw located in and cutting across the course of the pipe when moved by said fingers on said rack, the outer finger of the series being located outside of and close to the saw.

4. The combination with pipe welding apparatus, pipe finishing rolls and a receiving trough back of and in line therewith, of a pipe cooling rack at the side of the trough having a series of continuously moving fingers in line with each other adapted to engage the pipe body at different points in its length, and a saw located in and cutting across the course of the pipe, said series of fingers having one such finger moving on each side of and close to the saw.

In testimony whereof, I the said GEORGE DUNCAN have hereunto set my hand.

GEORGE DUNCAN.

Witnesses:
J. A. CAUGHEY,
E. P. COREY.